UNITED STATES PATENT OFFICE.

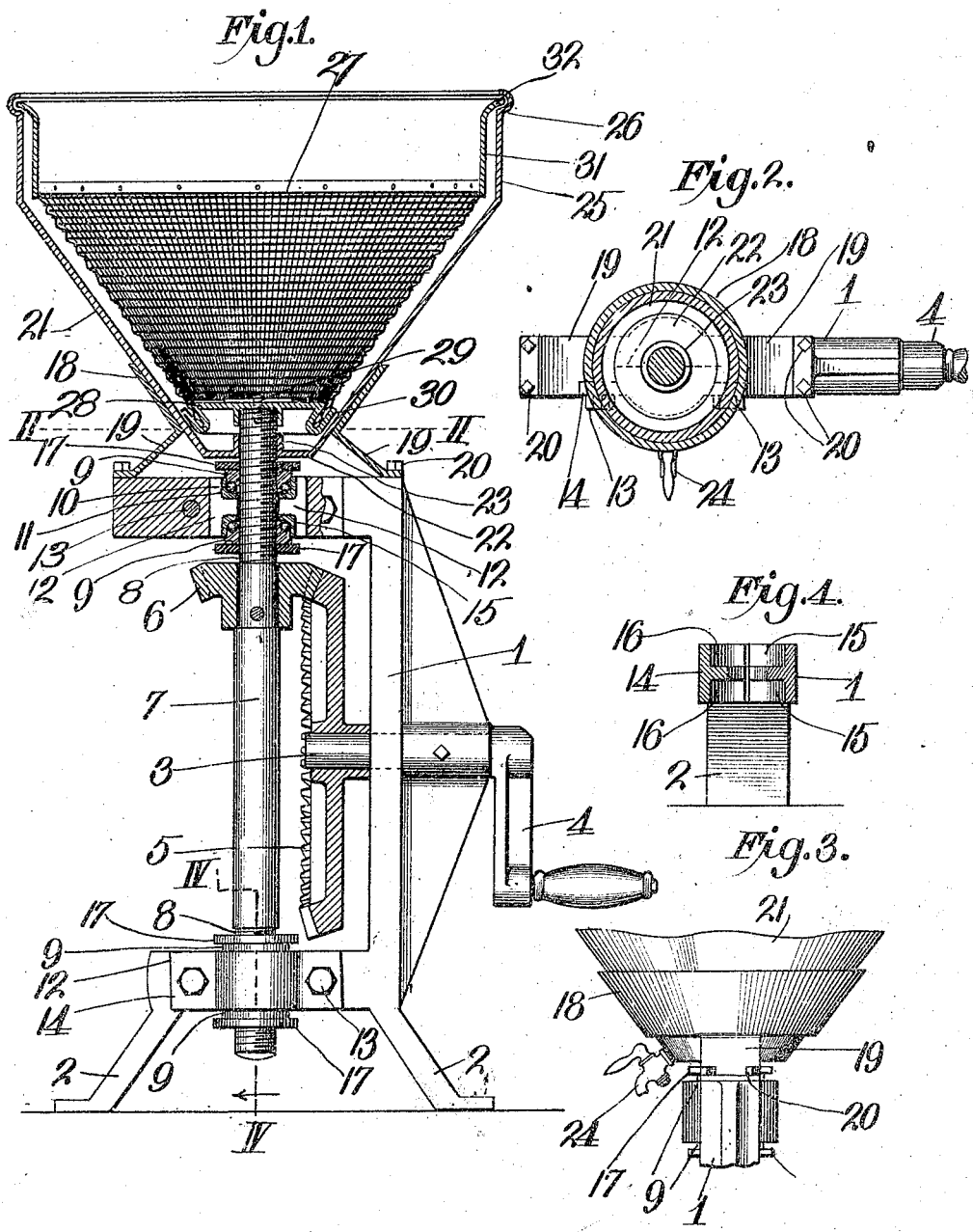

PETER F. BUBB, OF LEAVENWORTH, KANSAS.

CENTRIFUGAL CLOTHES-WRINGER.

1,145,291.                       Specification of Letters Patent.        Patented July 6, 1915.

Application filed August 31, 1914. Serial No. 859,366.

*To all whom it may concern:*

Be it known that I, PETER F. BUBB, a citizen of the United States, residing at Leavenworth, in the county of Leavenworth and State of Kansas, have invented certain new and useful Improvements in Centrifugal Clothes-Wringers, of which the following is a specification.

This invention relates to centrifugal clothes wringers and my object is to produce a wringer which will efficiently and expeditiously wring out any kind of fabric without injury thereto.

With this general object in view the invention consists in certain novel and peculiar features of construction and organization as hereinafter described and claimed; and in order that it may be fully understood reference is to be had to the accompanying drawing, in which—

Figure 1, is a view mainly in central vertical section of a wringer embodying my invention. Fig. 2, is a horizontal section of the same on the line II—II of Fig. 1. Fig. 3, is a fragmentary elevation of the wringer as viewed from the handle side thereof. Fig. 4, is a vertical section taken on the line IV—IV of Fig. 1 but omitting the shaft and the ball-bearings.

In the said drawing, 1 indicates a substantially U-shaped frame arranged with the bridge portion thereof vertical so that the arms thereof shall lie one above the other and extending downward from the lower arm is a pair of legs 2, adapted to be fastened in any suitable manner to a stand or support not shown. Journaled in the vertical portion of the frame is a shaft 3, provided outward of the frame with a crank handle 4, and inward of the frame with a bevel gear wheel 5, meshing with the horizontally arranged bevel pinion 6 secured rigidly upon a vertical shaft 7, extending through the arms of the frame. The shaft where it extends through the frame is threaded as at 8 and secured on each of said threaded portions is a pair of nut members 9 of a ball bearing, the nut members being seated on balls 10, fitted in cup members 11 rigidly secured in the arms of the frame in any suitable manner. As shown the arms of the frame are provided with stepped recesses 12 (shown most clearly by dotted lines in Fig. 2) and fitting in said recesses and secured rigidly to the arms by cap screws 13 are bearing caps 14, which conjointly with the arms proper of said frame form the opening through which the shaft 7 extends and which also serve to clamp the cup members of the ball bearings rigidly in place, it being seen by reference to Fig. 4, that the arms of the frame and the bearing caps are recessed at 15 and 16 respectively, to provide chambers for the reception of said cups.
To prevent accidental unscrewing of the nut members, lock nuts 17 are mounted on the threaded portions of the shaft. It will be seen that the nut members and balls will rotate on the cup members when the shaft is turned by the operation of the crank handle.

18 is a conical collar arranged above the upper arm of the frame and provided with downwardly and outwardly extending legs 19 which rest upon and are bolted as at 20 or otherwise suitably secured to the upper end of the frame, and rigidly secured in said collar is an inverted shell 21, the same being truncated at its lower end and provided with a bottom 22, fitting loosely around the shaft above the uppermost nut member 9, said bottom having an upstanding circular wall 23 fitting loosely around the shaft to form a collecting chamber for water which escapes from said chamber by means of the drain faucet 24, this faucet being open when the wringer is in operation so that the water shall drain from the shell and thereby be prevented from overflowing the wall 23 and running down onto the ball bearings immediately below. The shell is provided at its upper end with a cylindrical extension 25 and is stiffened at its upper margin by an outwardly bowed annular flange 26.

Arranged within the shell is an inverted truncated conical basket 27 provided with an imperforate bottom in the form of a disk 28 which is secured firmly as at 29 upon the upper end of the shaft 8 just above the collecting chamber of the shell, the said disk bottom being formed marginally with a U-shaped seam 30 wherein is firmly secured the lower edge of the foraminous portion of the basket.

The foraminous basket is of large capacity being almost the same dimension as the shell and at its upper end it is provided with a cylindrical portion 31 which flares outwardly at its upper end as at 32 into the channel of the annular flange 26 of the shell, the latter thus serving as a guard against water splashing up between the cylindrical extensions of the shell and basket and onto the operator and also as a guard to prevent a person placing his hand upon the upper end of the appliance and perhaps being cut by contact with the edge of the upper end of the basket extension 31, through the rapid rotation of the latter.

To operate the machine the wet fabrics to be wrung out are deposited in the foraminous basket which is then rapidly rotated through the instrumentality of the crank handle 4, this action of the basket whirling the fabrics around with great rapidity and through centrifugal force effecting the outward discharge of the water from the fabrics through the foraminous basket and against the shell, the water falling down upon the walls of the latter and into the collecting chamber at the bottom thereof and escaping thence through the faucet 24, the operation of the handle continuing until the fabrics are as dry as though they had been run between the ordinary rubber roller wringer, it being obvious that the position of the fabrics within the basket can be changed one or more times before the wringing operation is completed if it is thought that the wringing operation can be facilitated by changing the position of the fabrics in the foraminous basket, though it is to be understood that the wringing can be efficiently and expeditiously performed without shifting the position of the fabrics.

It will be apparent that the machine may be motor driven if desired and that it will be safe for the attendant to reach into the basket for removing a fabric or changing its position or for placing additional fabrics in the basket while the latter is in operation, as the channeled flange 26 of the shell guards against the operator accidentally coming in contact with the upper edge of the basket.

From the above description it will be apparent that I have produced a centrifugal wringer embodying the features of advantage enumerated as desirable, and which obviously may be modified in minor particulars without departing from the spirit and scope of the appended claims.

I claim:—

1. A centrifugal clothes wringer, comprising a supporting frame, a vertical shaft extending through and journaled in said frame, a shell fitting loosely around said shaft and provided with an upstanding wall around the shaft, means rigid with said frame for supporting said shell, a foraminous basket located within the shell and secured rigidly to the upper end of said shaft, and means for imparting rapid rotation to said shaft for the purpose of wringing fabrics within the basket by expelling the water therefrom through centrifugal force.

2. A centrifugal clothes wringer, comprising an inverted truncated shell, provided at its upper end with an outwardly bowed circular bead to provide an internal channel, a shaft extending into the shell centrally of the bottom thereof, means for holding the shell stationary, an inverted truncated conical basket arranged within the shell and rigidly secured at its lower end to said shaft and flared at its upper margin outwardly into the channel of said bead, and means for imparting rotation to said shaft.

3. A centrifugal clothes wringer, comprising a supporting frame, a vertical shaft extending through and journaled in said frame, a collar supported from and above said frame, an inverted conical truncated shell resting in and secured to said collar and fitting around the upper end of said shaft, and provided at its upper end with a cylindrical extension having an outwardly bowed bead at its upper margin; said shell also having a wall projecting upward from its bottom around said shaft and a drain faucet below the plane of the upper edge of said wall, and a basket within the shell comprising a bottom secured upon the upper end of said shaft, an inverted truncated conical foraminous body secured at its lower edge to said bottom and a cylindrical extension at the upper end of said body, flared at its upper edge and fitting within the internal channel produced by the outwardly bowed bead of the extension of the shell.

In testimony whereof, I affix my signature, in the presence of two witnesses.

PETER F. BUBB.

Witnesses:
 HAROLD C. SHORT, Jr.,
 LEO R. KLASINSKI.